(12) United States Patent
Motohashi

(10) Patent No.: US 7,770,043 B2
(45) Date of Patent: Aug. 3, 2010

(54) DATA PROCESSING DEVICE AND METHOD OF CONTROLLING POWER CONSUMPTION IN BACK-LIGHT IN DATA PROCESSING DEVICE

(75) Inventor: Teruyuki Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1127 days.

(21) Appl. No.: 11/381,014

(22) Filed: May 1, 2006

(65) Prior Publication Data

US 2006/0244584 A1    Nov. 2, 2006

Related U.S. Application Data

(62) Division of application No. 09/666,796, filed on Sep. 21, 2000, now Pat. No. 7,124,313.

(30) Foreign Application Priority Data

Sep. 21, 1999    (JP)    ................................ 11-266946

(51) Int. Cl.
*G06F 1/32* (2006.01)
*G09G 3/36* (2006.01)

(52) U.S. Cl. ..................... 713/324; 345/102; 379/372

(58) Field of Classification Search ................. 713/300, 713/324; 345/102; 379/372
See application file for complete search history.

(56) References Cited

U.S. PATENT DOCUMENTS

| | | | |
|---|---|---|---|
| 5,272,327 A | 12/1993 | Mitchell et al. | |
| 5,479,275 A * | 12/1995 | Abileah | ........................... 349/5 |
| 5,488,384 A | 1/1996 | Uehara et al. | |
| 5,548,832 A | 8/1996 | Karam | |
| 5,638,421 A | 6/1997 | Serrano et al. | |
| 5,652,893 A | 7/1997 | Ben-Meir et al. | |
| 5,815,228 A | 9/1998 | Flynn | |
| 5,887,179 A | 3/1999 | Halahmi et al. | |
| 5,964,879 A | 10/1999 | Dunstan et al. | |
| 6,151,008 A | 11/2000 | Zhang | |
| 6,205,343 B1 | 3/2001 | Montogomery, Jr. | |
| 6,243,727 B1 | 6/2001 | Watts, Jr. | |
| 6,278,887 B1 | 8/2001 | Son et al. | |
| 6,323,849 B1 * | 11/2001 | He et al. | ...................... 345/204 |
| 6,583,579 B2 | 6/2003 | Tsumura | |
| 6,812,649 B2 | 11/2004 | Kim | |
| 7,220,045 B2 * | 5/2007 | Chang | ......................... 362/633 |
| 7,394,448 B2 * | 7/2008 | Park et al. | .................... 345/102 |

FOREIGN PATENT DOCUMENTS

| | | | |
|---|---|---|---|
| GB | 2 261 983 A | 6/1993 | |
| GB | 2 298 075 A | 8/1996 | |

(Continued)

*Primary Examiner*—Thomas Lee
*Assistant Examiner*—Eric Chang
(74) *Attorney, Agent, or Firm*—Sughrue Mion, PLLC

(57) ABSTRACT

A data processing device includes (a) a display unit, (b) a light-emitting unit which illuminates the display unit, (c) a communication unit which makes radio communication with other data processing devices, (d) a detector which detects whether the communication unit is in operation or not, and (e) a controller which limits a current to be supplied to the light-emitting unit in accordance with transmission power consumed in radio communication carried out by the communication unit, when the detector has detected that the communication unit is in operation.

20 Claims, 11 Drawing Sheets

FOREIGN PATENT DOCUMENTS

| | | |
|---|---|---|
| GB | 2 298 499 A | 9/1996 |
| GB | 2 313 741 A | 12/1997 |
| JP | 4-263305 | 9/1992 |
| JP | 6-120864 | 4/1994 |
| JP | 7-327004 | 12/1995 |
| JP | 7-327004 A | 12/1995 |
| JP | 8-181755 A | 7/1996 |
| JP | 5737615 | 4/1998 |
| JP | 11-126118 | 5/1999 |
| JP | 11-239203 | 8/1999 |
| JP | 11-275182 | 10/1999 |
| JP | 2000-324239 | 11/2000 |

* cited by examiner

FIG. 2
PRIOR ART

| RESIDUAL POWER V | NUMBERS |
|---|---|
| $V \geqq V_1$ | $M_1$ |
| $V_1 > V \geqq V_2$ | $M_2$ |
| $V_2 > V \geqq V_3$ | $M_3$ |
| ⋮ | ⋮ |

FIG. 8

| CONDITIONS | | FIRST SIGNAL $53_1$ | SECOND SIGNAL $53_2$ |
|---|---|---|---|
| RADIO COMMUNICATION? | GREATER THAN V1? | | |
| NO | — | LOW | HIGH |
| YES | NO | HIGH | LOW |
| YES | YES | LOW | LOW |

F I G. 10
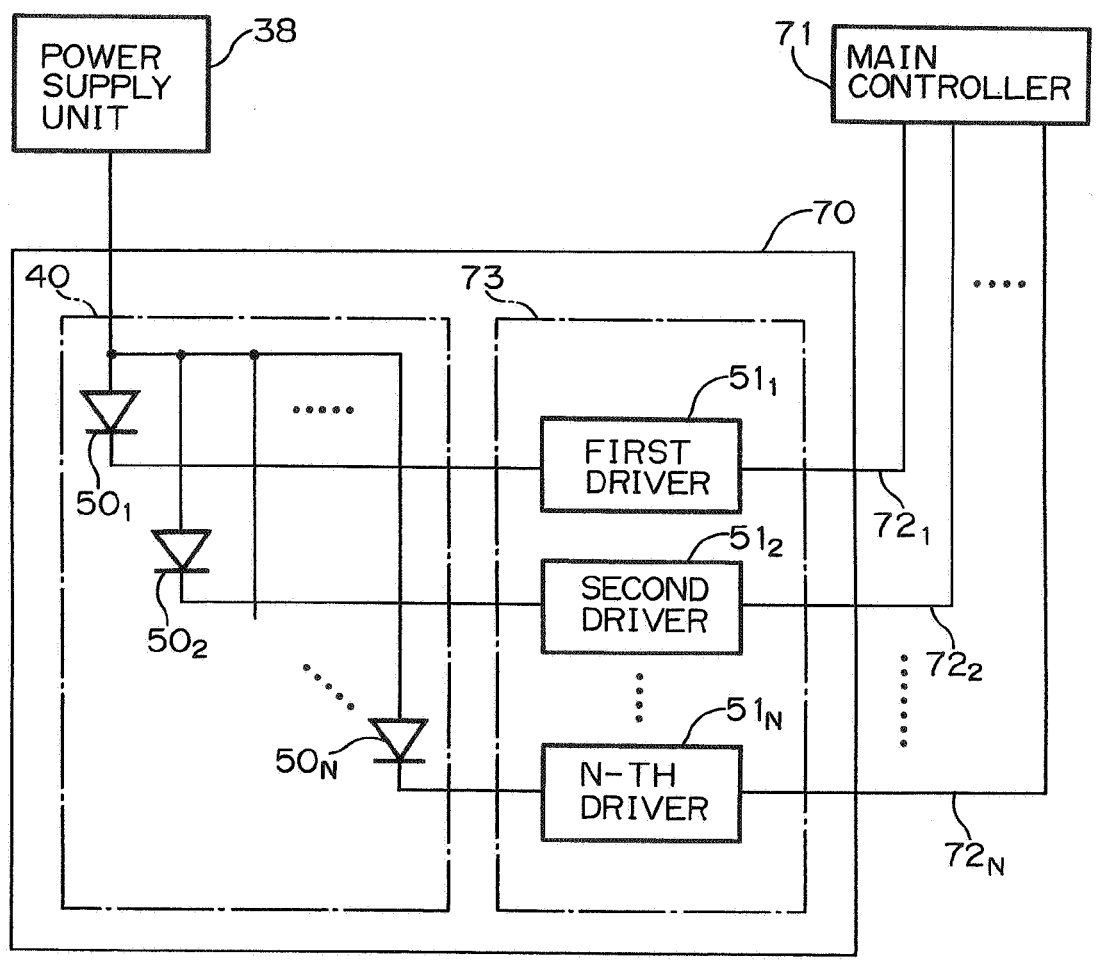

DATA PROCESSING DEVICE AND METHOD OF CONTROLLING POWER CONSUMPTION IN BACK-LIGHT IN DATA PROCESSING DEVICE

This is a divisional of application Ser. No. 09/666,796, filed Sep. 21, 2000 now U.S. Pat. No. 7,124,313, which claims priority from Japanese Patent Application No. 11-266946, filed Sep. 21, 1999, the entire disclosure of which applications are hereby incorporated by reference.

BACKGROUND OF THE INVENTION

1. Field of the Invention

The invention relates to a data processing device and a method of operating the same, and more particularly to a data processing device having a back-light unit driven by a battery, and a method of saving power consumption in the back-light unit.

2. Description of the Related Art

A data processing device is generally designed to include an interface, a control unit, and a display unit, wherein the control unit carries out an operation in accordance with instructions input thereinto through the interface by a user, and the display unit displays data such as characters which are results of an operation having been carried out by the control unit.

Such a data processing device as mentioned above includes a personal computer and a portable communication terminal. A personal computer displays data input thereinto by a user through a keyboard and/or results of processing the input data, on a display unit. A portable communication terminal displays data input thereinto by a user through an interface such as a key pad or push buttons and/or results of processing the input data, on a display unit.

A control unit in such a data processing device as mentioned above can be fabricated smaller and lighter because of progress in integration technology and techniques of mounting parts on a device. A display unit also can be fabricated thinner and smaller, and can display quite small characters thereon. For instance, a liquid crystal display (LCD) is usually used as a display unit in a data processing device. As a result, there have been developed many data processing devices which are portable and have high performances, and there is still a need for a data processing device having higher performances and being smaller and lighter.

A liquid crystal display used as a display unit carries out displaying by virtue of variation in an index of refraction of a light, and hence, it is necessary to illuminate a liquid crystal display from the back thereof by means of a back-light unit. A back-light function can be accomplished, for instance, by driving a light-emitting device. As such a light-emitting device, there is usually used a light-emitting diode.

A back-light unit has to be kept driven while a liquid crystal display is in operation. Hence, a current has to be kept supplied to a liquid crystal display in accordance with light-emission of the liquid crystal display. As a result, power consumption of a back-light unit occupies a high weight in overall power consumption of a data processing unit.

In a data processing device such as a portable communication terminal and a cellular phone, an interface is illuminated from the back thereof in order to assist a user to handle the interface.

As mentioned so far, a data processing device is generally designed to include a back-light unit for various purposes which back-light unit consumes much power. On the other hand, it would be necessary to be able to drive a data processing device with a battery as long as possible in order to ensure portability of a data processing device. To this end, it is necessary to reduce overall power consumption of a data processing device. Hence, many attempts have been made to reduce power consumption of a data processing device having a back-light unit.

FIG. 1 is a block diagram of one of conventional data processing devices. The illustrated data processing device constitutes a portable communication terminal, and is comprised of an interface 10 including keys, an output unit 11 displaying an operation carried out by the interface 10 and results of such an operation, a back-light unit 12 including a plurality of light-emitting devices and illuminating the interface 10 or the output unit 11, a timer unit 13 controlling a period of time in which the back-light unit 12 is turned on, a battery 14 supplying electric power to parts constituting the data processing device, a detector 15 detecting residual power of the battery 14, a table 16 storing the number of the light-emitting devices to be turned on in accordance with the residual power of the battery 14, detected by the detector 15, and a controller 17 controlling operations of the above-mentioned parts constituting the data processing device.

In operation, when a predetermined key in the interface 10 is actuated to thereby cause the battery 14 to supply electric power to the parts of the data processing device, the controller 17 turns the back-light unit 12 on to illuminate the interface 10 and the output unit 11. The controller 17 always monitors the residual power of the battery 14 detected by the detector 15, and turns on the light-emitting devices for a predetermined period of time measured by the timer 13 by the number dependent on the detected residual power of the battery 14. After the predetermined period of time has passed, the controller 17 turns off the light-emitting devices.

The data processing device illustrated in FIG. 1 reduces power consumption in the above-mentioned manner to thereby enable the data processing device to operate as long as possible.

FIG. 2 illustrates an example of the table 16. As illustrated in FIG. 2, the table 16 stores the number of the light-emitting devices to be turned on among all of the light-emitting devices constituting the back-light unit 12, in dependence on the residual power V of the battery 14, detected by the detector 15.

For instance, if the residual power V of the battery 14, detected by the detector 15, is smaller than a first threshold voltage $V_1$, but equal to or greater than a second threshold voltage $V_2$, $M_2$ light-emitting devices are turned on among all of the light-emitting devices constituting the back-light unit 12.

The controller 17 is designed to include a central processing unit (CPU), and carries out such a control as mentioned above in accordance with a control program stored in a memory such as a read only memory (ROM).

FIG. 3 is a flow-chart of an operation to be carried out by the controller 17 in accordance with a control program stored in a memory.

The controller 17 always monitors the residual power V of the battery 14, detected by the detector 15, and first compares the detected residual power V to a first threshold voltage V1, in step S20.

If the residual power V is judged to be equal to or greater than the first threshold voltage V1 (YES in step S20), the controller 17 turns on the light-emitting devices by the number of M1 among all of the light-emitting devices constituting the back-light unit 12, in accordance with the table 16, in step S21.

If the residual power V is judged to be smaller than the first threshold voltage V1 (NO in step S20), the controller 17 then compares the residual power V to a second threshold voltage V2, in step S22.

If the residual power V is judged to be equal to or greater than the second threshold voltage V2 (YES in step S22), the controller 17 turns on the light-emitting devices by the number of M2 among all of the light-emitting devices constituting the back-light unit 12, in accordance with the table 16, in step S23.

If the residual power V is judged to be smaller than the second threshold voltage V2 (NO in step S23), the controller 17 then compares the residual power V to a third threshold voltage V3, in step S24.

If the residual power V is judged to be equal to or greater than the third threshold voltage V3 (YES in step S24), the controller 17 turns on the light-emitting devices by the number of M3 among all of the light-emitting devices constituting the back-light unit 12, in accordance with the table 16, in step S25.

If the residual power V is judged to be smaller than the third threshold voltage V3 (NO in step S24), the controller 17 turns of the light-emitting devices by a predetermined number which is determined in dependence on the residual power V.

After the controller 17 has turned on the light-emitting devices by the predetermined number among all of the light-emitting devices constituting the back-light unit 12, the controller 17 causes the timer 13 to measure a time, in step S26.

The timer 13 measures the lapse of time, and increments a period of time T at a predetermined cycle, in step S27. The controller 17 monitors the incremented time T measured by the timer 13, and judges whether the time T is over a predetermined threshold period of time T1, in step S28.

If the time T is not over the predetermined threshold period of time T1 (NO in step S28), the controller 17 keeps monitoring the time T until the time T reaches the predetermined threshold period of time T1.

If the time T is over the predetermined threshold period of time T1 (YES in step S28), the controller 17 turns off the light-emitting devices which were turned on in steps S21, S23 or S25, in step S29.

Thus, the controller 17 finishes the operation of controlling the back-light unit 12.

The data processing device having been explained with reference to FIGS. 1 to 3 is suggested in Japanese Unexamined Patent Publication No. 7-327004.

The Publication also suggests a data processing device which changes the threshold period of time T1 to vary a period of time in which the light-emitting devices are turned on, in accordance with the residual power V of the battery 14 detected by the detector 15, thereby reducing power consumption in the data processing device.

Though only the back-light unit 12 for illuminating a display unit or an interface from the back thereof has been explained so far, the explanation about the back-light unit 12 is also applied to a side-light unit (not illustrated) for illuminating a display unit or an interface from the side thereof.

With development in communication network, a data processing device as mentioned above is designed to have a function of making communication. Such a data processing device has to transmit radio signals for making communication with other communication terminals such as a cellular phone, for instance, in the personal digital cellular (PDC) system (RCR STD-27) standardized as a standard digital cellular phone system in Japan. In general, transmission of a radio signal consumes much power.

Hence, a data processing device having a back-light unit and a function of making radio communication has to include a battery having a capacity sufficient to supply a current to drive the back-light unit and carry out the function of making radio communication, even if the technique suggested in the above-mentioned Japanese Unexamined Patent Publication No. 7-327004 is applied to the data processing device. A data processing device has to further include a power supply circuit associated with the battery.

Hence, as the battery has to be fabricated larger in size, the power supply circuit has to be fabricated larger in size, resulting in problems of incapability of designing a data processing device to be smaller and lighter, incapability of ensuring portability, and an increase in fabrication cost.

A data processing device having a back-light or side-light unit and another unit for carrying out a certain function such as a function of making radio communication would be accompanied with the above-mentioned problems.

Japanese Unexamined Patent Publication No. 4-263305 has suggested a portable terminal having a liquid crystal display unit, comprising first means for detecting that any data is not displayed on the liquid crystal display unit for a predetermined period of time, second means for interrupting power supply to the liquid crystal display unit when the first means has detected that any data is not displayed on the liquid crystal display unit for the predetermined period of time, third means for detecting whether a user makes a touch with the liquid crystal display unit for requesting the liquid crystal display unit to re-start display, and fourth means for supplying power to the liquid crystal display unit again in response to the request of a user.

Japanese Unexamined Patent Publication No. 10-164188 has suggested a portable terminal comprising a circuit having a light-receiving device for detecting a light. Illumination to a display unit is controlled based on an output signal transmitted from the circuit.

The above-mentioned problems remain unsolved even by the portable terminals suggested in the above-mentioned Publications.

SUMMARY OF THE INVENTION

In view of the above-mentioned problems, it is an object of the present invention to provide a data processing device which includes a back-light or side-light unit and another unit for carrying out a certain function such as a function of making radio communication, but which can reduce power consumption to thereby keep portability.

It is also an object of the present invention to provide a method of operating a data processing device which method can do the same.

In one aspect of the present invention, there is provided a data processing device including (a) a display unit, (b) a light-emitting unit which illuminates the display unit, (c) a detector which detects whether a specific functional part in the data processing device is in operation or not, and (d) a controller which limits a current to be supplied to the light-emitting unit when the detector has detected that the specific functional part in the data processing unit is in operation.

There is further provided a data processing device including (a) a display unit, (b) a light-emitting unit which illuminates the display unit, (c) detector which detects whether a specific functional part in the data processing device is in operation or not, and (d) a controller which controls the number of light-emitting units to be turned on, when the detector has detected that the specific functional part in the data processing unit is in operation.

In accordance with the firstly and secondly mentioned invention, it is possible to reduce power consumption in both the specific functional part and the light-emitting unit such as a back-light or side-light unit, ensuring reduction in overall power consumption in the data processing device. The reduction in overall power consumption in the data processing device lengthens a lifetime of a battery and enhances portability of the data processing device, and further makes it possible to decrease a capacity of a battery, ensuring a smaller size of a power supply circuit associated with the battery, reduction in size and weight of the data processing device, and reduction in fabrication cost of the data processing device.

There is still further provided a data processing device including (a) a display unit, (b) a light-emitting unit which illuminates the display unit, (c) a communication unit which makes radio communication with other data processing devices, (d) a detector which detects whether the communication unit is in operation or not, and (e) a controller which limits a current to be supplied to the light-emitting unit when the detector has detected that the communication unit is in operation.

In accordance with the above-mentioned invention, it would be possible to limit a current to be supplied to the light-emitting unit to reduce light emission thereof, when the detector has detected that the communication unit is in operation, that is, when much power is consumed for transmitting a radio signal. As a result, it would be possible to reduce overall power consumption in the data processing device.

There is yet further provided a data processing device including (a) a display unit, (b) a light-emitting unit which illuminates the display unit, (c) a communication unit which makes radio communication with other data processing devices, (d) a detector which detects whether the communication unit is in operation or not, and (e) a controller which limits a current to be supplied to the light-emitting unit in accordance with transmission power consumed in radio communication carried out by the communication unit, when the detector has detected that the communication unit is in operation.

In accordance with the above-mentioned invention, it would be possible to limit a current to be supplied to the light-emitting unit in accordance with transmission power consumed in radio communication carried out by the communication unit, to reduce light emission of the light-emitting unit, when the detector has detected that the communication unit is in operation, that is, when much power is consumed for transmitting a radio signal. As a result, it would be possible to reduce overall power consumption in the data processing device without deterioration in handling property of the data processing device which deterioration would be caused by reduction in display quality.

There is still yet further provided a data processing device including (a) a display unit, (b) a light-emitting unit which illuminates the display unit, (c) a communication unit which makes radio communication with other data processing devices, (d) a detector which detects whether the communication unit is in operation or not, and (e) a controller which controls the number of light-emitting units to be turned on, when the detector has detected that the communication unit is in operation.

In accordance with the above-mentioned invention, it would be possible to reduce the number of light-emitting units to be turned on to reduce light emission thereof, when the detector has detected that the communication unit is in operation, that is, when much power is consumed for transmitting a radio signal. As a result, it would be possible to reduce overall power consumption in the data processing device. In addition, it is no longer necessary for the data processing device to include a control circuit for controlling a current to be supplied to the light-emitting units, ensuring simplification in a structure of the data processing device.

There is further provided a data processing device including (a) a display unit, (b) a light-emitting unit which illuminates the display unit, (c) a communication unit which makes radio communication with other data processing devices, (d) a detector which detects whether the communication unit is in operation or not, and (e) a controller which controls the number of light-emitting units to be turned on in accordance with transmission power consumed in radio communication carried out by the communication unit, when the detector has detected that the communication unit is in operation.

In accordance with the above-mentioned invention, it would be possible to reduce the number of light-emitting units to be turned on, in accordance with transmission power consumed in radio communication carried out by the communication unit, to reduce light emission of the light-emitting unit, when the detector has detected that the communication unit is in operation, that is, when much power is consumed for transmitting a radio signal. As a result, it would be possible to reduce overall power consumption in the data processing device without deterioration in handling property of the data processing device which deterioration would be caused by reduction in display quality. In addition, it is no longer necessary for the data processing device to include a control circuit for controlling a current to be supplied to the light-emitting units, ensuring simplification in a structure of the data processing device.

It is preferable that the data processing device further includes an interface through which data is input into the data processing unit, and that the light-emitting unit illuminates the interface.

The illumination of the interface enhances handling property of the data processing device for a user.

In another aspect of the present invention, there is provided a method of operating a data processing device including a display unit and a light-emitting unit which illuminates the display unit, including the steps of (a) detecting whether a specific functional part in the data processing device is in operation or not, and (b) limiting a current to be supplied to the light-emitting unit when it has been detected that the specific functional part in the data processing unit is in operation.

There is further provided a method of operating a data processing device including a display unit and a light-emitting unit which illuminates the display unit, including the steps of (a) detecting whether a specific functional part in the data processing device is in operation or not, and (b) limiting the number of light-emitting units to be turned on, when it has been detected that the specific functional part in the data processing unit is in operation.

There is still further provided a method of operating a data processing device including a display unit, a light-emitting unit which illuminates the display unit, and a communication unit which makes radio communication with other data processing devices, including the steps of (a) detecting whether the communication unit is in operation or not, and (b) limiting a current to be supplied to the light-emitting unit when it has been detected that the communication unit is in operation.

There is yet further provided a method of operating a data processing device including a display unit, a light-emitting unit which illuminates the display unit, and a communication unit which makes radio communication with other data processing devices, including the steps of (a) detecting whether the communication unit is in operation or not, and (b) limiting a current to be supplied to the light-emitting unit in accordance with transmission power consumed in radio communication carried out by the communication unit, when it has been detected that the communication unit is in operation.

There is still yet further provided a method of operating a data processing device including a display unit, a light-emitting unit which illuminates the display unit, and a communication unit which makes radio communication with other data processing devices, including the steps of (a) detecting whether the communication unit is in operation or not, and (b) limiting the number of light-emitting units to be turned on, when it has been detected that the communication unit is in operation.

There is further provided a method of operating a data processing device including a display unit, a light-emitting unit which illuminates the display unit, and a communication unit which makes radio communication with other data processing devices, including the steps of (a) detecting whether the communication unit is in operation or not, and (b) limiting the number of light-emitting units to be turned on in accordance with transmission power consumed in radio communication carried out by the communication unit, when it has been detected that the communication unit is in operation.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2 illustrates an example of a table included in the data processing device illustrated in FIG. 1.

FIG. 8 is a table showing a relation between first and second control signals and conditions for transmitting the first and second control signals.

FIG. 10 is a detailed block diagram of the data processing device illustrated in FIG. 9.

DESCRIPTION OF THE PREFERRED EMBODIMENTS

Preferred embodiments in accordance with the present invention will be explained hereinbelow with reference to drawings.

First Embodiment

Figure 1:
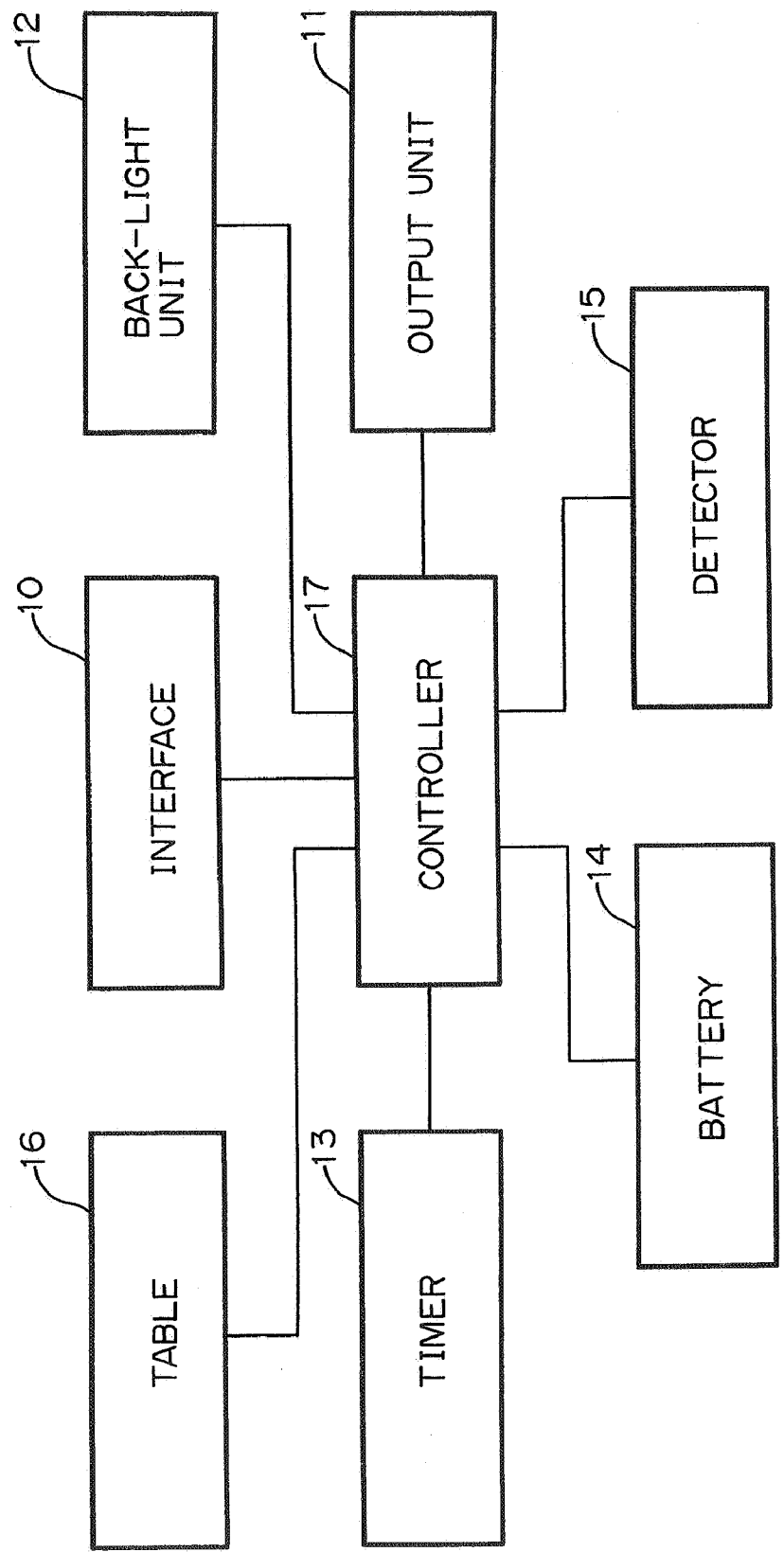
FIG. 1 is a block diagram of a conventional data processing device.
Figure 3:
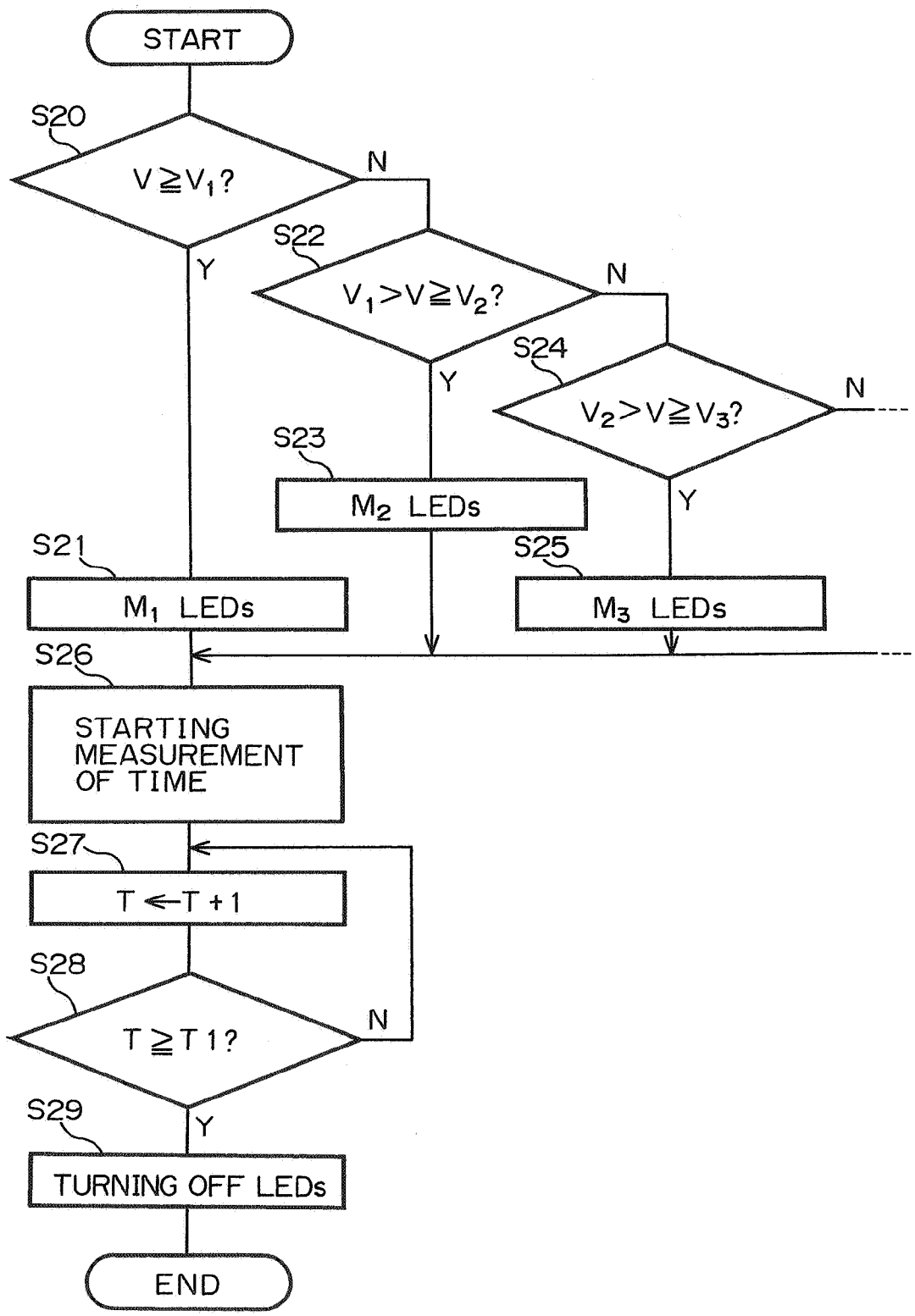
FIG. 3 is a flow-chart of an operation to be carried out by the data processing device illustrated in FIG. 1.
Figure 4:
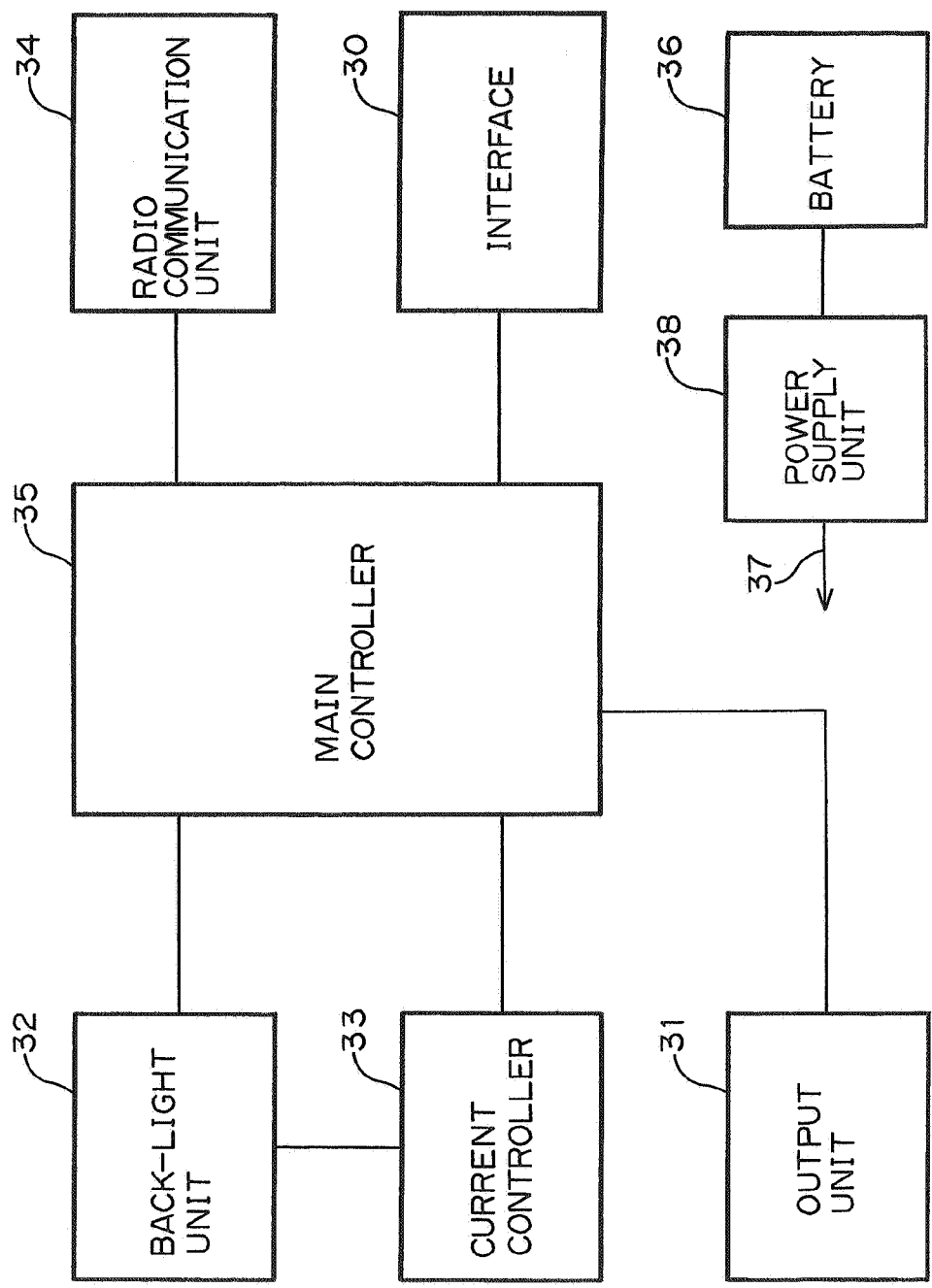
FIG. 4 is a block diagram of a data processing device in accordance with the first embodiment of the present invention.

FIG. 4 is a block diagram of a data processing device in accordance with the first embodiment of the present invention.

As illustrated in FIG. 4, the data processing device is comprised of an interface 30 through which data is input into a later mentioned main controller 35, an output device 31, a back-light unit 32 including a plurality of light-emitting devices and illuminating the interface 30 or the output unit 31 from the back thereof, a current controller 33 which controls a current to be supplied to the back-light unit 32 for driving the back-light unit 32, a radio communication unit 34 which makes communication with other data processing devices through radio signals, and a main controller 35 controlling operations of the above-mentioned parts constituting the data processing device.

The data processing device further includes a battery 36 generating a voltage at which the data processing device operates, and a power supply unit 38 which stabilizes a voltage generated by the battery 36 and supplies the thus stabilized voltage 37 to the parts constituting the data processing device.

The interface 30 includes a keyboard and/or push buttons in dependence on data-input style of a data processing device.

The output device 31 is comprised of a liquid crystal display panel displaying thereon data such as characters and results of an operation carried out by the main controller 35.

The back-light unit 32 is comprised of a plurality of light-emitting diodes (LED), and starts or ceases light emission in accordance with an instruction transmitted from the main controller 35. Since a liquid crystal display displays various data thereon by virtue of variation in an index of refraction of a light, the back-light unit 32 illuminates the output device 31 comprised of a liquid crystal display panel, from the back. In addition, if the interface 31 is comprised of push buttons, the back-light unit 32 illuminates a panel of the push buttons on which numerals are indicated, from the back.

The current controller 33 determines a current to be supplied to a plurality of the light-emitting devices constituting the back-light unit 32, among a plurality of predetermined currents, in accordance with a control signal transmitted from the main controller 35.

The radio communication unit 34 carries out communication through radio signals by controlling power necessary for transmitting radio signals, in dependence on both a distance between the data processing device and a base station which is an upper grade station for the data processing device, and how much radio signals are presently used by other data processing devices.

If a radio signal is transmitted with a power equal to a power with which a radio signal is transmitted when the data processing device is located far from a base station arranged for each of cells, even though the data processing device is located near to the base station, the transmitted radio signal would have a too high intensity, resulting in high probability of interfering with other radio signals. Hence, the current controller 34 optimizes a power necessary for transmitting a radio signal from the data processing device in accordance with an intensity at which a base station receives the transmitted radio signal, to prevent interference with other data processing devices and unnecessary power consumption.

In the data processing device in accordance with the first embodiment, the main controller 35 always monitors whether radio communication is being made by the radio communication unit 34. The main controller 35 varies a current to be supplied to a plurality of the light-emitting diodes constituting the back-light unit 32, in accordance with whether radio communication is being made by the radio communication unit 34, or in accordance with a power at which a radio signal is transmitted from the radio communication unit 34, if radio communication is now made by the radio communication unit 34. Thus, the main controller 35 reduces power consumption in the back-light unit 32 to accomplish both reduction in size and weight of the battery 36 and the power supply unit 38 and reduction in fabrication cost of the data processing device.

Figure 5:
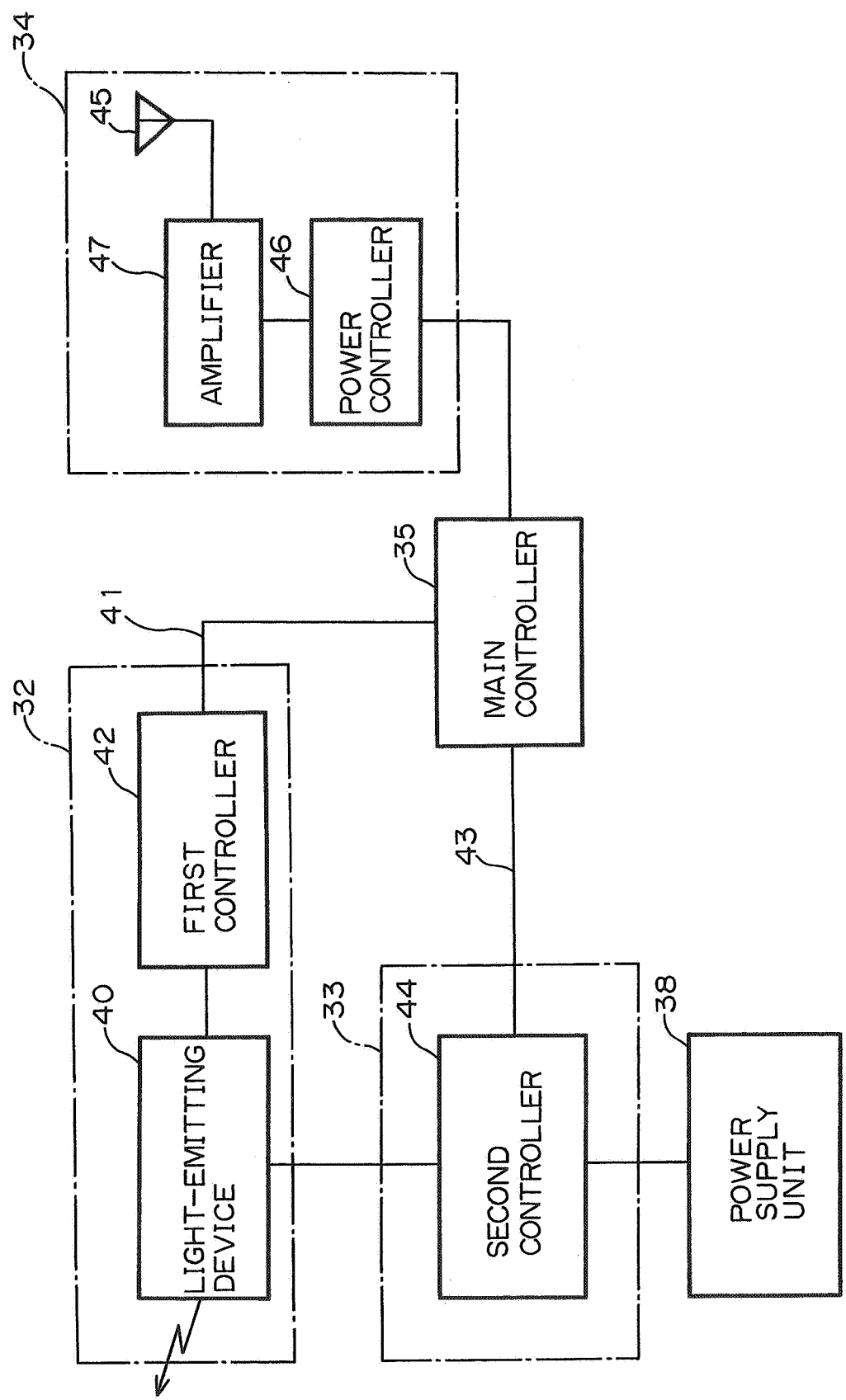
FIG. 5 is a detailed block diagram of the data processing device illustrated in FIG. 4.

FIG. 5 is a detailed block diagram of the data processing device in accordance with the first embodiment. Parts or elements corresponding to those in FIG. 4 have been provided the same reference numerals, and will not be explained in detail.

The back-light unit 32 is comprised of a light-emitting device 40 including a plurality of light-emitting diodes (LED), and a first controller 42 which turns the light-emitting device 40 on or off in accordance with a first control signal 41 transmitted from the main controller 35.

The current controller 33 includes a second controller 44 which varies a current to be supplied to the light-emitting device 40 in accordance with a second control signal 43 transmitted from the main controller 35.

The radio communication unit 34 includes an antenna 45 through which radio signals transmitted from a base station are received and radio signals are transmitted to a base station, a power controller 46 which controls a power necessary for the antenna 45 to transmit a radio signal to a base station, in accordance with both a distance between the data processing device and a base station and how much radio signals are used by other data processing devices, and an amplifier 47 which amplifies a radio signal up to a power indicated by the power controller 46.

The light-emitting device 40 is turned on or off by the first controller 42 in accordance with the first control signal 41 transmitted from the main controller 35.

The second controller 44 transforms a voltage supplied from the power supply unit 38, into a current to be supplied to the light-emitting device 40, in accordance with the second control signal 43 transmitted from the main controller 35.

The main controller 35 monitors the power controller 46 carrying out a control to a power necessary for transmitting a radio signal, and judges whether radio communication is now being carried out or not. In addition, the main controller 35 monitors a power at which a radio signal is transmitted from the radio communication unit 34. The main controller 35, based on both the judgment as to whether radio communication is being carried out and the monitored power, transmits the first control signal 41 to the first controller 42 and the second control signal 43 to the second controller 44.

The back-light unit 32 emits a light in accordance with a current supplied from the second controller 44, when the light-emitting device 40 is being turned on by he first controller 42.

Figure 6:
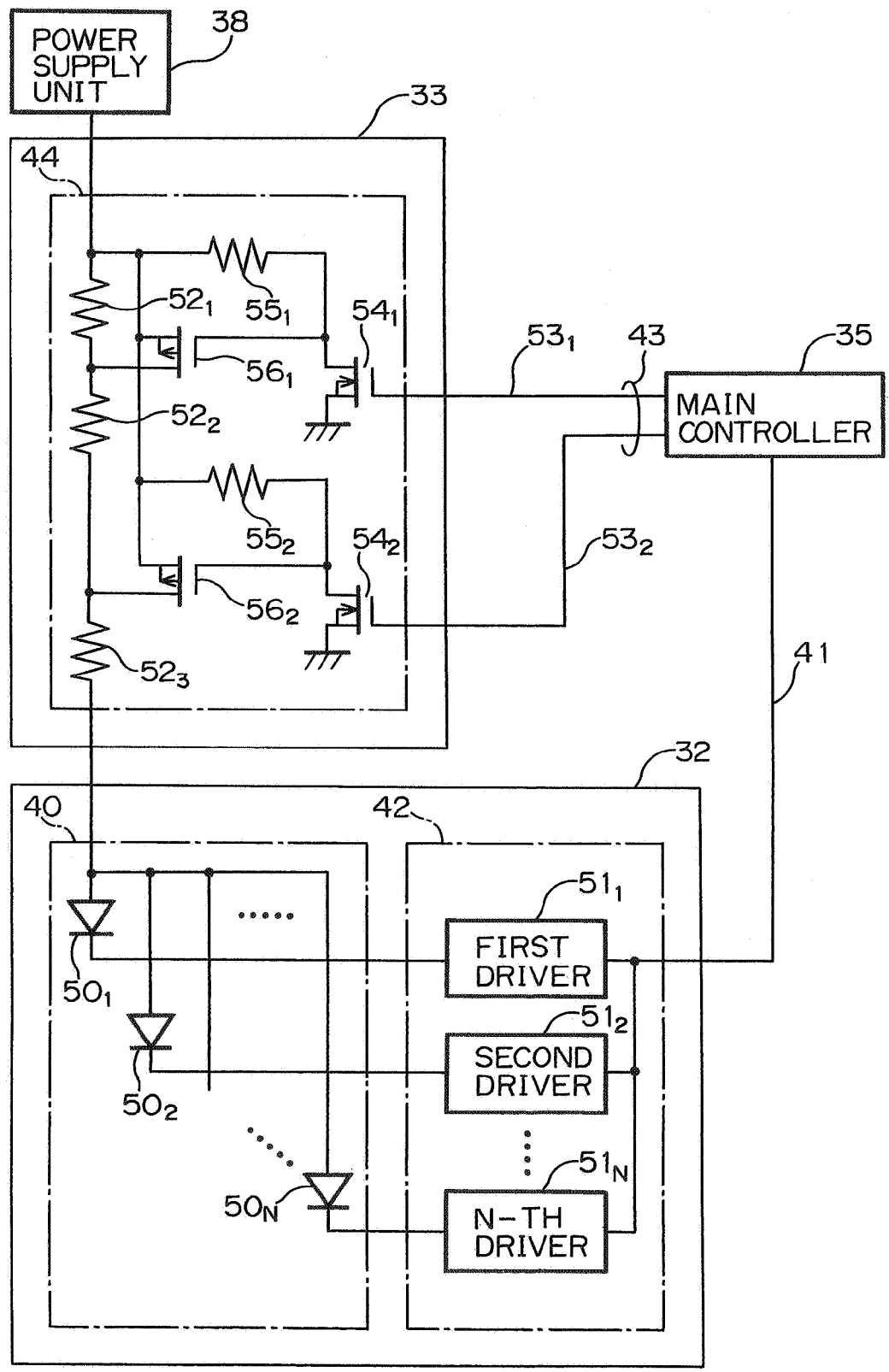
FIG. 6 is another detailed block diagram of the data processing device illustrated in FIG. 4.

FIG. 6 is another detailed block diagram of the data processing device in accordance with the first embodiment. Parts or elements corresponding to those in FIG. 5 have been provided the same reference numerals, and will not be explained in detail.

The light-emitting device 40 includes first to N-th light-emitting diodes $50_1$ to $50_N$ each having an anode terminal electrically connected to the second controller 44 and a cathode terminal electrically connected to the first controller 42.

The first controller 42 includes first to N-th drivers $51_1$ to $51_N$ associated with the first to N-th light-emitting diodes $50_1$ to $50_N$, respectively. The first to N-th drivers $51_1$ to $51_N$ are electrically connected to the cathode terminals of the associated first to N-th light-emitting diodes $50_1$ to $50_N$, and turns the associated first to N-th light-emitting diodes $50_1$ to $50_N$ on or off by controlling a voltage to be applied to the associated first to N-th light-emitting diodes $50_1$ to $50_N$, in accordance with the first control signal transmitted from the main controller 35.

The second controller 44 includes a resistor electrically connected at one end to the power supply unit 38 and at the other end to the anode terminals of the first to N-th light-emitting diodes $50_1$ to $50_N$ constituting the light-emitting device 40. The resistor is comprised of first to third resistors $52_1$ to $52_3$ electrically connected in series with one another. The second controller 44 supplies a current from the power supply unit 38 to the first to N-th light-emitting diodes $50_1$ to $50_N$.

In addition, the second controller 44 receives the second control signal 43 from the main controller 35. The second control signal includes a first signal $53_1$ and a second signal $53_2$. The first signal $53_1$ is input into a first n-channel field effect transistor $54_1$ through a gate terminal thereof, and the second signal $53_2$ is input into a second n-channel field effect transistor $54_2$ through a gate terminal thereof.

The first and second n-channel field effect transistors $54_1$ and $54_2$ have a source terminal which is grounded.

The first n-channel field effect transistor $54_1$ has a drain terminal which is electrically connected to both one end of a first pull-up resistor $55_1$ and a gate terminal of a first p-channel field effect transistor $56_1$. Both the other end of the first pull-up resistor $55_1$ and a source terminal of the first p-channel field effect transistor $56_1$ are electrically connected to the power supply unit 38. A drain terminal of the first p-channel field effect transistor $56_1$ is electrically connected to a node at which the first and second resistors $52_1$ and $52_2$ are connected to each other.

The second n-channel field effect transistor $54_2$ has a drain terminal which is electrically connected to both one end of a second pull-up resistor $55_2$ and a gate terminal of a second p-channel field effect transistor $56_2$. Both the other end of the second pull-up resistor $55_2$ and a source terminal of the second p-channel field effect transistor $56_2$ are electrically connected to the power supply unit 38. A drain terminal of the second p-channel field effect transistor $56_2$ is electrically connected to a node at which the second and third resistors $52_2$ and $52_3$ are connected to each other.

The main controller 35 transmits the first and second control signals 41 and 43 by which the back-light unit 32 and the current controller 33 are controlled, in accordance with a control program stored in a memory such as CPU or ROM.

Figure 7:
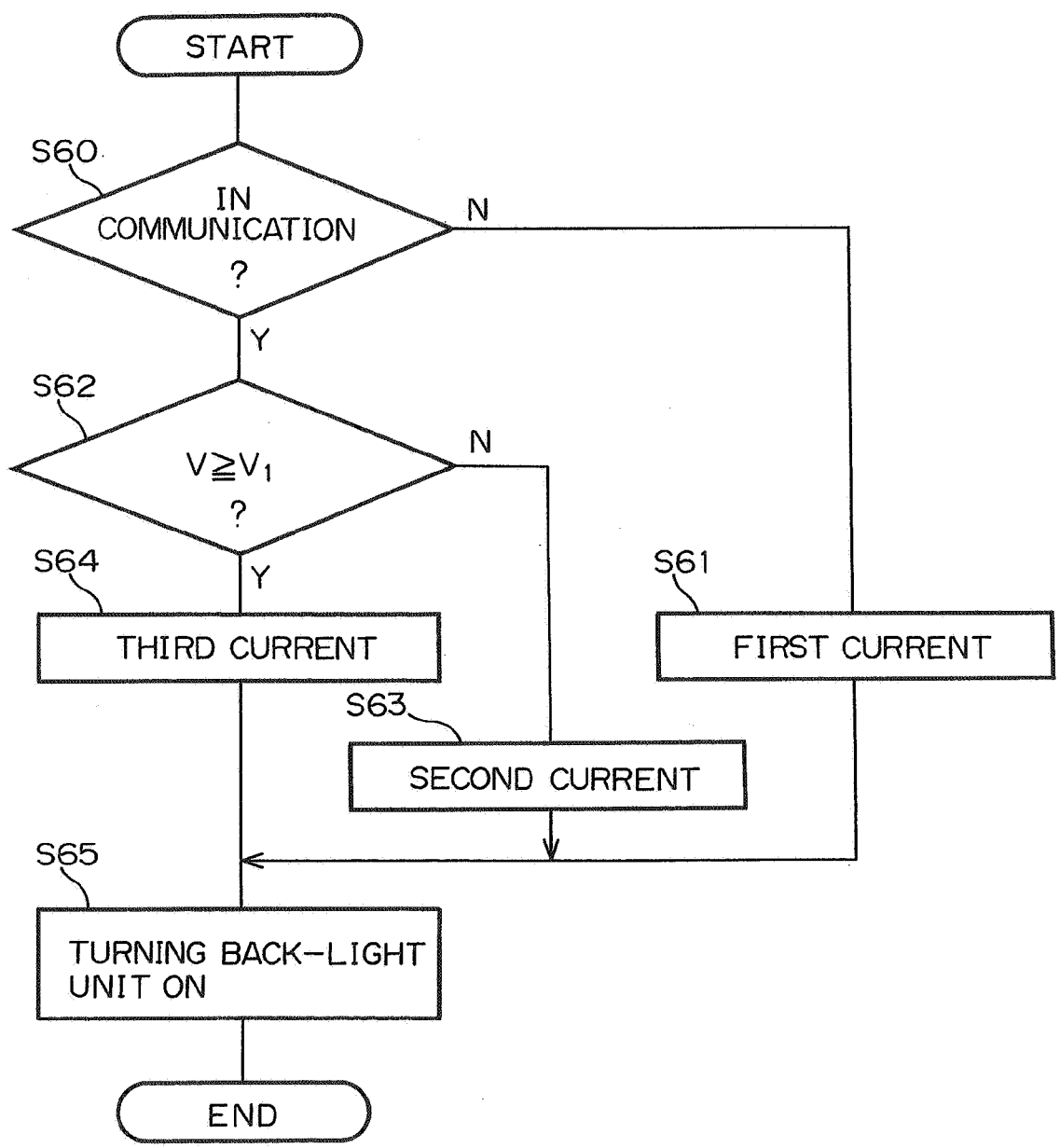
FIG. 7 is a flow-chart of an operation to be carried out by the data processing device illustrated in FIG. 4.

FIG. 7 is a flow-chart of an operation carried out by the back-light unit 32 and the current controller 33 in accordance with the above-mentioned control program stored in a memory.

When a user request to turn the back-light unit 32 on, the main controller 35 monitors a control carried out by the power controller 46 of the radio communication unit 34, and judges whether radio communication is being carried out by the radio communication unit 34, before turning the back-light unit 34 on, in step S60.

When the main controller 35 judges that radio communication is not made by the radio communication unit 34 (NO in step S60), the main controller 35 transmits the first control signal 43 including the first and second signals $53_1$ and $53_2$, to the second controller 44 to thereby cause the second controller 44 to allow a first current to be supplied to the light-emitting device 40 from the power supply unit 38, in step S61.

Herein, the first current means a current to be supplied to the light-emitting device 40 without limitation.

When the main controller 35 judges that radio communication is now being made by the radio communication unit 34 (YES in step S60), the main controller 35 monitors the power controller 46 to thereby detect a power at which a radio signal is transmitted from the radio communication unit 34. Then, the main controller 35 compares the thus detected power V to a predetermined first threshold voltage V1, in step S62.

If the power V is smaller than the first threshold voltage V1 (NO in step S62), the main controller 35 transmits the first control signal 43 including the first and second signals 53$_1$ and 53$_2$, to the second controller 44 to thereby cause the second controller 44 to allow a second current to be supplied to the light-emitting device 40 from the power supply unit 38, in step S63. Herein, the second current is smaller than the first current.

If the power V is equal to or greater than the first threshold voltage V1 (YES in step S62), the main controller 35 transmits the first control signal 43 including the first and second signals 53$_1$ and 53$_2$, to the second controller 44 to thereby cause the second controller 44 to allow a third current to be supplied to the light-emitting device 40 from the power supply unit 38, in step S64. Herein, the third current is smaller than the second current.

As mentioned above, the main controller 35 selects one of the first to third currents to be supplied to the light-emitting device 40 by varying the second control signal 43.

FIG. 8 shows conditions for generating the first and second signals 53$_1$ and 53$_2$.

When the radio communication unit 34 does not make radio communication, the main controller 35 transmits the first signal 53$_1$ having a low logic level and the second signal 53$_2$ having a high logic level, to the second controller 44.

When the radio communication unit 34 is making radio communication and the power V at which a radio signal is transmitted from the radio communication unit 34 is smaller than the first threshold voltage V1, the main controller 35 transmits the first signal 53$_1$ having a high logic level and the second signal 53$_2$ having a low logic level, to the second controller 44.

When the radio communication unit 34 is making radio communication and the power V at which a radio signal is transmitted from the radio communication unit 34 is equal to or greater than the first threshold voltage V1, the main controller 35 transmits the first signal 53$_1$ having a low logic level and the second signal 53$_2$ having a low logic level, to the second controller 44.

In the second controller 44 receiving the first signal 53$_1$ having a low logic level and the second signal 53$_2$ having a high logic level when the radio communication unit 34 is not making radio communication, the first n-channel field effect transistor 54$_1$ is kept off, because the first signal 53$_1$ input thereinto through a gate terminal has a low logic level. On the other hand, the second n-channel field effect transistor 54$_2$ is kept on, because the second signal 53$_2$ input thereinto through a gate terminal has a high logic level.

Accordingly, a drain terminal of the second n-channel field effect transistor 54$_2$ is at a ground level, and hence, the second p-channel field effect transistor 56$_2$ is turned on. As a result, opposite ends of both the first and second resistors 52$_1$ and 52$_2$ are short-circuited. Hence, the first current running across only the third resistor 52$_3$ is supplied to the anode terminals of the first to N-th light-emitting diodes 50$_1$ to 50$_N$.

In the second controller 44 receiving the first signal 53$_1$ having a high logic level and the second signal 53$_2$ having a low logic level when the radio communication unit 34 is making radio communication and the power V is smaller than the first threshold voltage V1, the first n-channel field effect transistor 54$_1$ is kept on, because the first signal 53$_1$ input thereinto through a gate terminal has a high logic level. On the other hand, the second n-channel field effect transistor 54$_2$ is kept off, because the second signal 53$_2$ input thereinto through a gate terminal has a low logic level.

Accordingly, a drain terminal of the first n-channel field effect transistor 54$_1$ is at a ground level, and hence, the first p-channel field effect transistor 56$_1$ is turned on. As a result, opposite ends of the first resistor 52$_1$ is short-circuited. Hence, the second current running across both the second and third resistors 52$_2$ and 52$_3$ is supplied to the anode terminals of the first to N-th light-emitting diodes 50$_1$ to 50$_N$.

In the second controller 44 receiving the first signal 53$_1$ having a low logic level and the second signal 53$_2$ having a low logic level when the radio communication unit 34 is making radio communication and the power V is equal to or greater than the first threshold voltage V1, the first n-channel field effect transistor 54$_1$ is kept off, because the first signal 53$_1$ input thereinto through a gate terminal has a low logic level. On the other hand, the second n-channel field effect transistor 54$_2$ is kept off, because the second signal 53$_2$ input thereinto through a gate terminal has a low logic level.

Accordingly, none of the first to third resistors 52$_1$ to 52$_3$ is short-circuited. Hence, the third current running across the first to third resistors 52$_1$ to 52$_3$ is supplied to the anode terminals of the first to N-th light-emitting diodes 50$_1$ to 50$_N$.

As having been explained so far, power consumption in transmitting a radio signal becomes almost zero when the radio communication unit 34 is not making radio communication. Hence, by transmitting the first current which is greatest among a current to be supplied to the light-emitting device 40, to the light-emitting device 40, it is possible to illuminate the output unit 31 and so on, ensuring enhancement of handling property of the data processing device by a user.

When the radio communication unit 34 is making radio communication and the power V at which the radio communication unit 34 transmits a radio signal is equal to or greater than the predetermined first threshold voltage V1, transmission of a radio signal consumes much power. Hence, by transmitting the third current which is smallest among a current to be supplied to the light-emitting device 40, to the light-emitting device 40, it is possible to reduce power consumption in the back-light unit 32.

When the radio communication unit 34 is making radio communication and the power V is smaller than the predetermined first threshold voltage V1, transmission of a radio signal consumes relatively small power. Hence, by transmitting the second current which is greater than the third current, but is smaller than the first current, to the light-emitting device 40, it is possible to enhance handling property of the data processing device by a user, and reduce power consumption in the back-light unit 32.

Turning back to FIG. 7, after the main controller 35 has determined the first, second or third current to be supplied to the light-emitting device 40 in step S61, S63 or S64, the main controller 35 transmits the first control signal 41 to the first controller 42 to drive the first to N-th drivers 51$_1$ to 51$_N$ for applying a voltage to the first to N-th light-emitting diodes 50$_1$ to 50$_N$.

As a result, the light-emitting device 40 is turned on, in step S65.

Thus, the operation of turning the back-light unit 32 on ends.

In the data processing device in accordance with the first embodiment, the main controller 35 always monitors whether radio communication is being made by the radio communication unit 34 and the power V consumed by the radio communication unit 34 for transmitting a radio signal. The main controller 35 varies a current to be supplied to the light-emitting device 40 constituting the back-light unit 32, in accordance with whether radio communication is being made by the radio communication unit 34, or in accordance with the power at which a radio signal is transmitted from the radio communication unit 34, if radio communication is now made by the radio communication unit 34. Thus, the main controller 35 reduces power consumption in the back-light unit 32 to accomplish both reduction in size and weight of the battery 36 and the power supply unit 38 and reduction in fabrication cost of the data processing device.

Second Embodiment

The data processing device in accordance with the above-mentioned first embodiment monitors a power consumed by the radio communication unit 34 for transmitting a radio signal, and varies a current to be supplied to the light-emitting device 40, in accordance with the thus monitored power, to thereby reduce power consumption in the back-light unit 32. As explained below, it is possible to reduce power consumption in the back-light unit 32 also by varying the number of light-emitting diodes to be turned on among the first to N-th light-emitting diodes $50_1$ to $50_N$.

Figure 9:
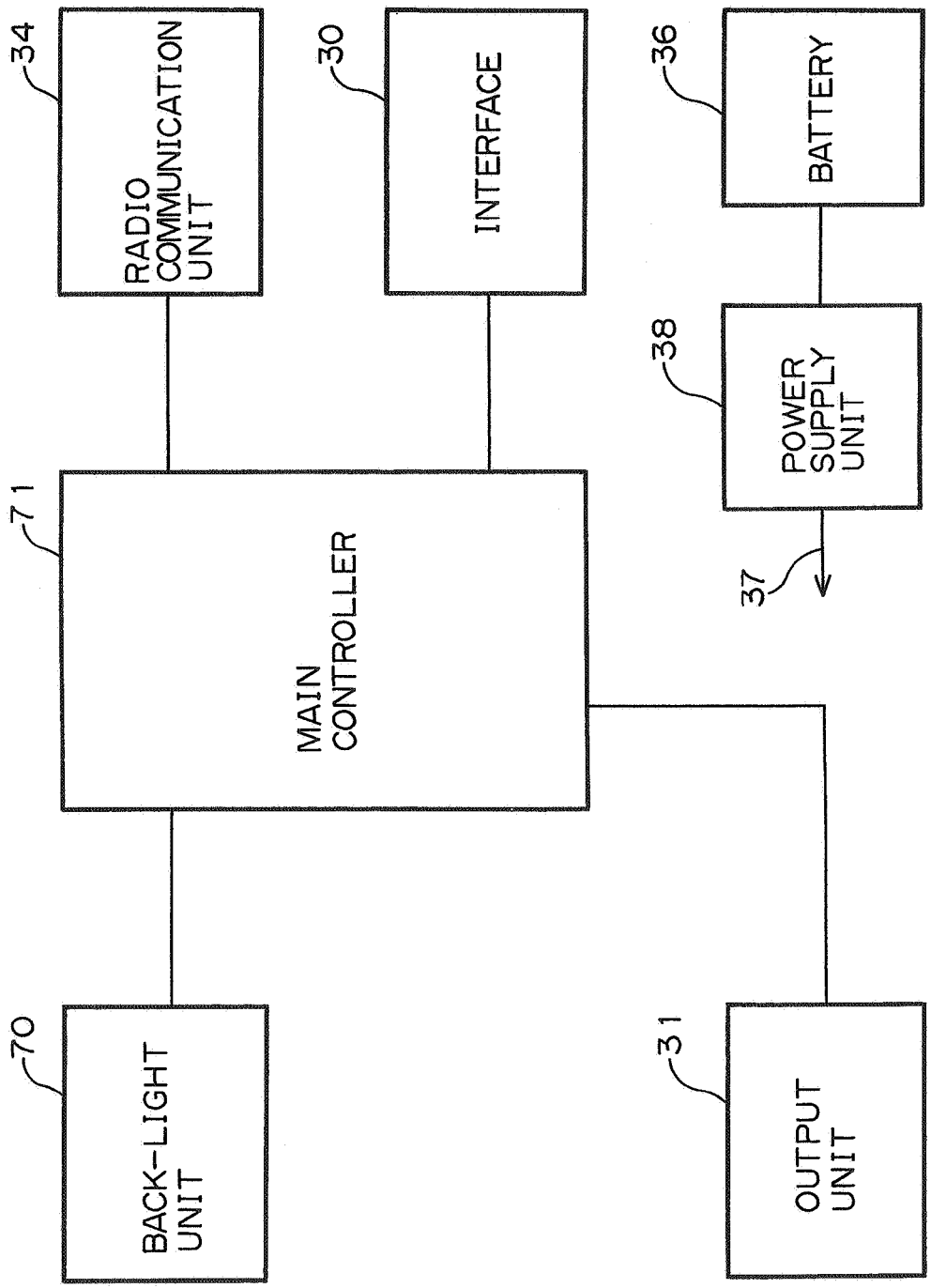
FIG. 9 is a block diagram of a data processing device in accordance with the second embodiment of the present invention.

FIG. 9 is a block diagram of the data processing device in accordance with the second embodiment. Parts or elements corresponding to those in FIG. 4 have been provided the same reference numerals, and will not be explained in detail.

As illustrated in FIG. 9, the data processing device is comprised of an interface 30 through which data is input into a later mentioned main controller 71, an output device 31, a back-light unit 70 including a plurality of light-emitting devices and illuminating the interface 30 or a display unit (not illustrated) from the back thereof, a radio communication unit 34 which makes communication with other data processing devices through radio signals, and a main controller 71 controlling operations of the above-mentioned parts constituting the data processing device.

The data processing device further includes a battery 36 generating a voltage at which the data processing device operates, and a power supply unit 38 which stabilizes a voltage generated by the battery 36 and supplies the thus stabilized voltage 37 to the parts constituting the data processing device.

The data processing device in accordance with the second embodiment is designed not to include a part corresponding to the current controller 33 in the first embodiment.

The back-light unit 70 is comprised of a plurality of light-emitting diodes, each of which is turned on or off in accordance with an instruction transmitted from the main controller 71.

In the data processing device in accordance with the second embodiment, the main controller 71 always monitors whether radio communication is being made by the radio communication unit 34 and the power consumed by the radio communication unit 34 for transmitting a radio signal. The main controller 71 turns on or off either each of the light-emitting diodes or a predetermined number of the light-emitting diodes to thereby vary the number of the light-emitting diodes to be turned on, in accordance with whether radio communication is being made by the radio communication unit 34, or in accordance with the power at which a radio signal is transmitted from the radio communication unit 34, if radio communication is now made by the radio communication unit 34.

Thus, the main controller 71 reduces power consumption in the back-light unit 70 to accomplish both reduction in size and weight of the battery 36 and the power supply unit 38 and reduction in fabrication cost of the data processing device.

Hereinbelow is explained a structure and an operation of the data processing device in accordance with the second embodiment.

FIG. 10 is a detailed block diagram of the data processing device in accordance with the second embodiment. Parts or elements corresponding to those in FIG. 9 have been provided the same reference numerals, and will not be explained in detail.

The back-light unit 70 is comprised of a light-emitting device 40 including a plurality of light-emitting diodes (LED), and a controller 73 which turns the light-emitting device 40 on or off in accordance with first to N-th control signals $72_1$ to $72_N$ transmitted from the main controller 71.

The light-emitting device 40 includes first to N-th light-emitting diodes $50_1$ to $50_N$ each having an anode terminal electrically connected to the power supply unit 38 and a cathode terminal electrically connected to the controller 73.

The controller 73 includes first to N-th drivers $51_1$ to $51_N$ associated with the first to N-th light-emitting diodes $50_1$ to $50_N$, respectively. The first to N-th drivers $51_1$ to $51_N$ are electrically connected to the cathode terminals of the associated first to N-th light-emitting diodes $50_1$ to $50_N$, and turns the associated first to N-th light-emitting diodes $50_1$ to $50_N$ on or off by controlling a voltage to be applied to the associated first to N-th light-emitting diodes $50_1$ to $50_N$, in accordance with the first to N-th control signals $72_1$ to $72_N$ transmitted from the main controller 71.

The main controller 71 transmits the first to N-th control signals $72_1$ to $72_N$ by which the back-light unit 70 is controlled, in accordance with a control program stored in a memory (not illustrated) such as CPU or ROM.

Figure 11:
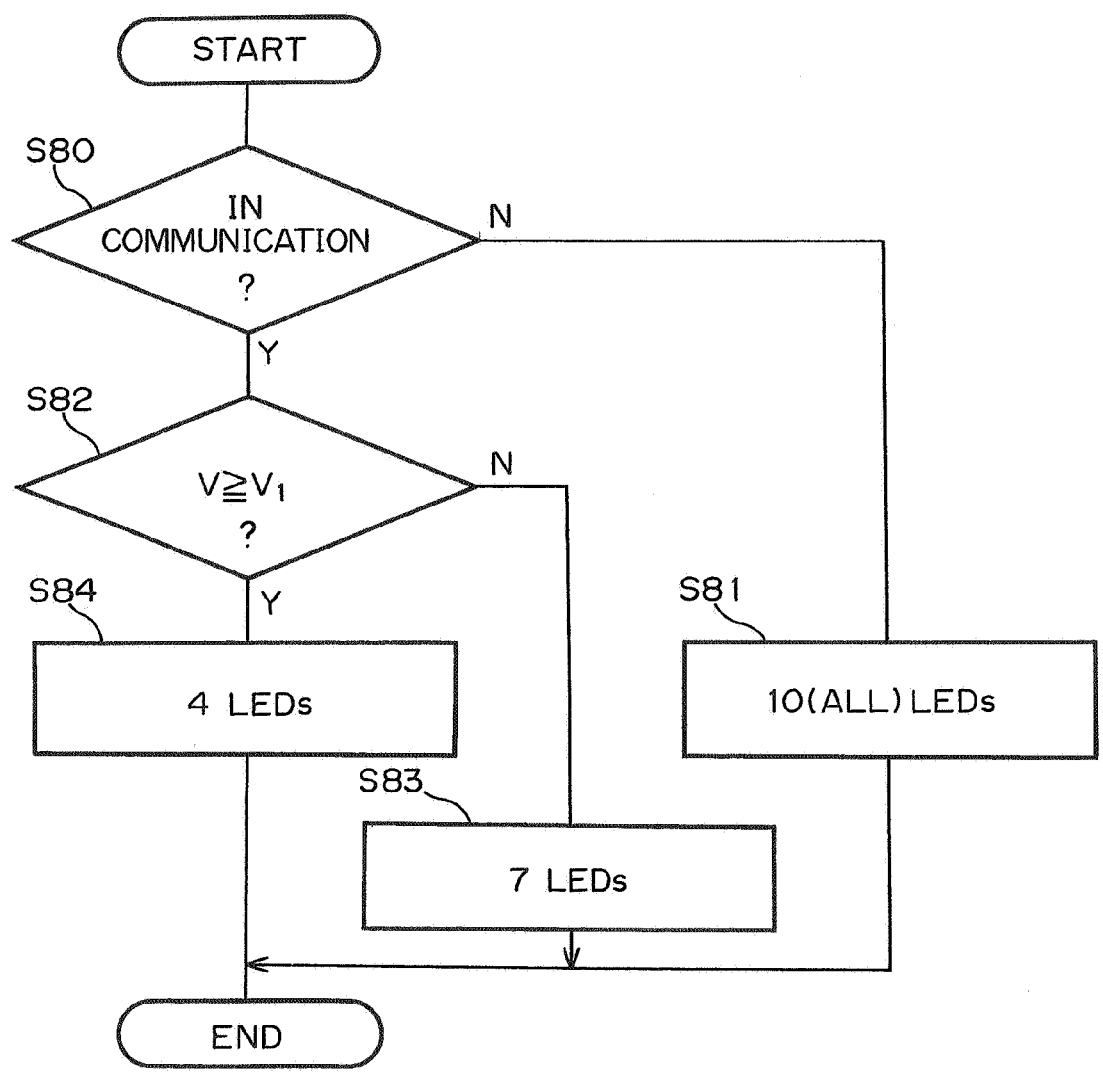
FIG. 11 is a flow-chart of an operation to be carried out by the data processing device illustrated in FIG. 9.

FIG. 11 is a flow-chart of an operation carried out by the back-light unit 70 in accordance with the above-mentioned control program stored in a memory.

Herein, it is assumed that the light-emitting device 40 includes 10 light-emitting diodes, for the purpose of simplification of explanation.

When a user request to turn the back-light unit 70 on, the main controller 71 monitors a control carried out by the power controller 46 of the radio communication unit 34, and judges whether radio communication is being carried out by the radio communication unit 34, before turning the back-light unit 70 on, in step S80.

When the main controller 71 judges that radio communication is not made by the radio communication unit 34 (NO in step S80), the main controller 71 transmits the first to tenth control signals $72_1$ to $72_{10}$ to the first to tenth drivers $51_1$ to $51_{10}$ to thereby turn the first to tenth light-emitting diodes $50_1$ to $50_{10}$ in step S81. In this case, a current to be supplied to the light-emitting device 40 is not limited at all.

When the main controller 71 judges that radio communication is now being made by the radio communication unit 34 (YES in step S80), the main controller 71 monitors the power controller 46 to thereby detect a power V at which a radio signal is transmitted from the radio communication unit 34. Then, the main controller 71 compares the thus detected power V to a predetermined first threshold voltage V1, in step S82.

If the power V is smaller than the first threshold voltage V1 (NO in step S82), the main controller 71 transmits the first to seventh control signals $72_1$ to $72_7$ to the first to seventh drivers $51_1$ to $51_7$, respectively, to thereby turn on the first to seventh light-emitting diodes $50_1$ to $50_7$, in step S83. Herein, a current to be supplied to the light-emitting device 40 is limited in comparison with the step S81.

If the power V is equal to or greater than the first threshold voltage V1 (YES in step S82), the main controller 71 transmits the first to third control signals $72_1$ to $72_3$ to the first to third drivers $51_7$ to $51_3$, respectively, to thereby turn on the first to third light-emitting diodes $50_1$ to $50_3$, in step S84. Herein, the number of light-emitting diodes to be turned on is set smallest to thereby minimize power consumption in the back-light unit 70.

After the main controller 71 has varied the number of light-emitting diodes to be turned on in steps S81, S83 or S84, the main controller 71 ends the operation of controlling power consumption in the back-light unit 70.

In the data processing device in accordance with the second embodiment, the main controller 71 always monitors whether radio communication is being made by the radio communication unit 34 and the power V consumed by the radio communication unit 34 for transmitting a radio signal. The main controller 71 varies the number of light-emitting diodes to be turned on, in accordance with whether radio communication is being made by the radio communication unit 34, or in accordance with the power at which a radio signal is transmitted from the radio communication unit 34, if radio communication is now made by the radio communication unit 34. Thus, the main controller 71 reduces power consumption in the back-light unit 32 to accomplish both reduction in size and weight of the battery 36 and the power supply unit 38 and reduction in fabrication cost of the data processing device.

In the above-mentioned first and second embodiments, the power V at which the radio communication unit 34 transmits a radio signal is compared to a single threshold voltage, and two different currents are supplied to the light-emitting device 40. However, it should be noted that the power V may be compared to two or more threshold voltages, and three or more different currents may be supplied to the light-emitting device 40.

In the data processing devices in accordance with the first and second embodiments, a current to be supplied to the back-light units 32 and 70 is controlled based on both whether the radio communication unit 34 is making radio communication and a power at which the radio communication unit 34 transmits a radio signal. However, it should be noted that a current to be supplied to the back-light units 32 and 70 may be controlled based only on whether the radio communication unit 34 is making radio communication.

The above-mentioned second embodiment is designed to include the drivers each of which is associated with each of the light-emitting diodes, and which are individually turned on or off in accordance with a control signal transmitted from the main controller 71. However, the light-emitting diodes may be turned on or off by a predetermined number in accordance with a control signal transmitted from the main controller 71.

In the data processing devices in accordance with the first and second embodiments, a current to be supplied to the back-light units 32 and 70 is controlled based on whether the radio communication unit 34 is making radio communication. As an alternative, a current to be supplied to the back-light units 32 and 70 may be controlled based on whether a part other than the back-light units 32 and 70, which operates concurrently with the back-light units 32 and 70, is in operation or not.

Though the first and second embodiments relate to a portable communication terminal, it should be noted that the present invention may be applied to a device which is necessary to reduce power consumption and which has a back-light or side-light unit.

Though the back-light units 32 and 70 are controlled with respect to a current to be supplied thereto in the first and second embodiments, it should be noted that a side-light unit may be controlled in the same way.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-266946 filed on Sep. 21, 1999 including specification, claims, drawings and summary is incorporated herein by reference in its entirety.

What is claimed is:

1. A data processing device comprising:
   (a) a display unit;
   (b) a plurality of light-emitting units which illuminate said display unit;
   (c) detector which detects a power level of a communication unit of said data processing device which makes communication with another device; and
   (d) a controller which turns off a number of said plurality of light-emitting units, said number being less than all, when said detector detects the power level indicating that there is communication between said data processing device and said other device in accordance with the detected power level.

2. The data processing device as set forth in claim 1, further comprising an interface through which data is input into said data processing unit, and wherein said light-emitting unit illuminates said interface.

3. The data processing device according to claim 1, wherein said light emitting unit, which are turned on, are independent of the location of the data to be displayed.

4. The data processing device according to claim 1, wherein said number is more than half of all of said plurality of light-emitting units.

5. The data processing device according to claim 4, wherein the controller turns off said number of the plurality of light-emitting units when the power level is greater than a threshold.

6. The data processing device according to claim 5, wherein the controller turns off less than half of all when the power level is smaller than the threshold.

7. A data processing device comprising:
   (a) a display unit;
   (b) a plurality of light-emitting units which illuminate said display unit;
   (c) a communication unit which makes radio communication with another data processing devices;
   (d) a detector which detects a power level of said communication unit; and
   (e) a controller which independently turns on/off a number of said plurality of light-emitting units, said the number being less than all, in accordance with the power level.

8. The data processing device as set forth in claim 7, further comprising an interface through which data is input into said data processing unit, and wherein said light-emitting unit illuminates said interface.

9. The data processing device according to claim 7, wherein said light emitting units, which are turned on, are independent of the location of the data to be displayed.

10. The data processing device according to claim 7, wherein the controller includes a plurality of drivers driving the plurality of light-emitting units.

11. A method of operating a data processing device comprising a display unit and a plurality of light-emitting units which illuminate said display unit, comprising the steps of:
   (a) detecting a power level of a communication unit of said data processing device which makes communication with another device; and
   (b) turning off a number of said light-emitting units, said number being less than all, when said power level indicates that there is communication between said data processing device and said other device in accordance with the detected power level.

12. The method of operating a data processing device according to claim 11, wherein said light emitting units, which are turned on, are independent of the location of the data to be displayed.

13. The method of operating a data processing device according to claim 11, wherein said number is more than half of all of said plurality of light-emitting units.

14. The method of operating a data processing device according to claim 13, wherein said number of the plurality of light-emitting units turned off when the power level is greater than a threshold.

15. The method of operating a data processing device according to claim 14, wherein less than half of all of the plurality of light-emitting units turned off when the power level is smaller than the threshold.

16. A method of operating a data processing device comprising a display unit, a plurality of light-emitting units which illuminates said display unit, and a communication unit which makes radio communication with other data processing devices, comprising the steps of:
   (a) detecting a power level of the communication unit which makes communication with another data processing device; and
   (b) independently turning on/off a number of said light-emitting unit, said number of being less than all, in accordance with the power level.

17. The method of operating a data processing device according to claim 16, wherein said light emitting units, which are turned on, are independent of the location of the data to be displayed.

18. A method of operating a data processing device including a display unit, a plurality of light-emitting units which illuminates said display unit, and a communication unit which makes radio communication with other data processing devices, comprising the steps of:
   (a) detecting a transmission power consumed in the radio communication carried out by said communication unit; and
   (b) turning on a number of said light-emitting units, said number is less than all and more than zero, when said transmission power is greater than a threshold.

19. The method of operating a data processing device according to claim 18, wherein the said number is less than half of all of the plurality of light emitting units.

20. The method of operating a data processing device according to claim 19, wherein more than half of all of the plurality of light emitting units are turned on when the transmission power is smaller than the threshold.

* * * * *